United States Patent
Wang et al.

(10) Patent No.: US 12,211,267 B2
(45) Date of Patent: Jan. 28, 2025

(54) METHOD, APPARATUS, MEDIUM AND DEVICE FOR EXTRACTING RIVER DRYING-UP REGION AND FREQUENCY

(71) Applicants: Satellite Application Center for Ecology and Environment, MEE, Beijing (CN); Wuhan University, Wuhan (CN)

(72) Inventors: Chen Wang, Beijing (CN); Jixi Gao, Beijing (CN); Chao Wang, Beijing (CN); Jianhui Zhang, Beijing (CN); Xuelei Wang, Beijing (CN); Yihuang Nie, Beijing (CN); Xing Jia, Beijing (CN); Huan Zhao, Beijing (CN); Shoujing Yin, Beijing (CN); Qian Zhao, Beijing (CN); Xiaogang Zhang, Beijing (CN); Yanting Wu, Beijing (CN); Dan Xu, Beijing (CN); Hao Sun, Beijing (CN); Nan Wang, Beijing (CN); Hongyan Yang, Beijing (CN); Bin Meng, Beijing (CN); Yaming Zhou, Beijing (CN)

(73) Assignees: Satellite Application Center for Ecology and Environment, MEE, Beijing (CN); Wuhan University, Wuhan (CN)

( * ) Notice: Subject to any disclaimer, the term of this patent is extended or adjusted under 35 U.S.C. 154(b) by 347 days.

(21) Appl. No.: 17/729,311

(22) Filed: Apr. 26, 2022

(65) Prior Publication Data

US 2022/0415044 A1 Dec. 29, 2022

(30) Foreign Application Priority Data

Jun. 23, 2021 (CN) .......................... 202110695402.8

(51) Int. Cl.
 *G06V 20/10* (2022.01)
 *G06V 10/34* (2022.01)

(52) U.S. Cl.
 CPC ............ *G06V 20/182* (2022.01); *G06V 10/34* (2022.01); *G06V 20/194* (2022.01)

(58) Field of Classification Search
 CPC ...... G06V 20/13; G06V 20/182; G06V 10/20; G06V 10/34; G06V 10/56; G06V 10/25;
 (Continued)

(56) References Cited

FOREIGN PATENT DOCUMENTS

| CN | 110147746 A | * | 8/2019 | ........... G06K 9/0063 |
|---|---|---|---|---|
| CN | 111199195 A | * | 5/2020 | ........... G06K 9/0063 |
| CN | 112990657 A | * | 6/2021 | ....... G06Q 10/06393 |

OTHER PUBLICATIONS

Machine translation of CN-110147746-A (obtained from google patents) (Year: 2019).*

(Continued)

*Primary Examiner* — Aaron W Carter
*Assistant Examiner* — Courtney Joan Nelson
(74) *Attorney, Agent, or Firm* — RAY QUINNEY & NEBEKER P.C.; Paul N. Taylor

(57) ABSTRACT

The present disclosure provides a method, apparatus, medium and device for extracting a river drying-up region and frequency, and belongs to the technical field of remote sensing. The method for extracting a river drying-up region and frequency can be applied to efficiently acquiring river drying-up information for a long time within the large spatial region. With the inverse normalized difference water index (iNDWI) and the maximum value composite (MVC) method for the remote sensing images, the present disclosure omits the troublesome step of separately extracting a river range for each image in the conventional method. In addition, the present disclosure quickly obtains the drying-up frequency (Continued)

by counting the total number of available images and the number of non-water images at the same pixel position, and yields a greater efficiency for extracting the river drying-up region and frequency.

8 Claims, 2 Drawing Sheets

(58) Field of Classification Search
CPC ...... G06V 10/40; G06V 20/10; G06V 10/143; G06V 20/05; G06V 20/38; G06T 2207/10032; G06T 7/136; G06T 17/05; G06T 5/50; Y02A 90/30; Y02A 20/402
See application file for complete search history.

(56) References Cited

OTHER PUBLICATIONS

Machine translation of CN-111199195-A (obtained from google patents) (Year: 2020).*
Machine translation of CN-112990657-A (obtained from google patents) (Year: 2021).*

* cited by examiner

METHOD, APPARATUS, MEDIUM AND DEVICE FOR EXTRACTING RIVER DRYING-UP REGION AND FREQUENCY

CROSS REFERENCE TO RELATED APPLICATION(S)

This patent application claims the benefit and priority of Chinese Patent Application No. 202110695402.8, filed on Jun. 23, 2021, the disclosure of which is incorporated by reference herein in its entirety as part of the present application.

TECHNICAL FIELD

The present disclosure relates to the technical field of remote sensing, and in particular, to a method, apparatus, medium and device for extracting a river drying-up region and frequency.

BACKGROUND ART

Water resources are crucial to promote the sustainable development and irreplaceable in human living, ecological balance and economic development. Surface water on the earth's surface is considered as an important indicator of the water resources, and plays a significant role in climate control, biogeochemical cycling and surface energy balance, etc. At present, due to the climate change, unreasonable utilization of water resources and large-scale mining, a number of rivers are drying up to severely damage the connectivity of water systems and affect the healthy ecological environment. Hence, real-time monitoring on drying-up of rivers is of high importance to maintain the healthy natural environment and sustainable economic development.

Satellite remote sensing was first used to study the surface water in 1970, and since then, a large number of studies have been conducted. With the rapid development of remote sensing satellites around 2000, multiple effective surface water coverage indexes such as a normalized difference water index (NDWI) and a modified NDWI (MNDWI) have been proposed and widely applied to studying distributions and changes of the surface water. However, when the drying-up of the rivers is extracted based on optical remote sensing satellites, the visual interpretation used in most cases is time-consuming, laborious and susceptible to subjective factors and thus cannot be applied to large regions. In addition, existing technologies are only intended to process images at a single time point to obtain the corresponding river drying-up conditions, and cannot find river drying-up regions and degrees/frequencies in a specific period (for example, in a year, summer or winter).

SUMMARY

In view of the above technical problems, the present disclosure provides a method, apparatus, medium and device for extracting a river drying-up region and frequency. The present disclosure can efficiently extract the river drying-up region and frequency for a long time within the large spatial region, to offer technical supports for river evaluation, management, protection and restoration.

The present disclosure provides the following technical solutions:

According to a first aspect, the present disclosure provides a method for extracting a river drying-up region and frequency, including:

S1: acquiring an optical remote sensing image set of a target region within a specified time period;

S2: preprocessing remote sensing images in the optical remote sensing image set to obtain multiple preprocessed images;

S3: computing, for each of the preprocessed images, inverse normalized difference water index (iNDWI) values of pixels in the preprocessed image, and adding the iNDWI values as new bands to a remote sensing image corresponding to the preprocessed image, to obtain multiple iNDWI images, $$iNDWI=(P_{NIR}-P_{Green})/(P_{NIR}+P_{Green})$$

where, $P_{NIR}$ and $P_{Green}$ are reflectivities of a near-infrared (NIR) band and a green band in the preprocessed image, respectively;

S4: taking, for a same spatial pixel position, pixels having maximum iNDWI values in all iNDWI images to obtain a maximum iNDWI pixel at the spatial pixel position, and mosaicking maximum iNDWI pixels of all spatial pixel positions according to the spatial positions to obtain a largest composite iNDWI image;

S5: setting an iNDWI threshold, and extracting all pixels with values greater than the iNDWI threshold in the largest composite iNDWI image to obtain the river drying-up region;

S6: cropping the iNDWI images according to the river drying-up region to obtain a first image set, and compositing the first image set into an effective monitoring number image having a single band, where, a band value at each spatial pixel position in the effective monitoring number image is a number of images each having an effective pixel at the spatial pixel position in the first image set;

S7: removing all pixels with values not greater than the iNDWI threshold in the iNDWI images with a masking method to obtain a second image set, and compositing the second image set into a drying-up number image having a single band, where, a band value at each spatial pixel position in the drying-up number image is a number of images each having an effective pixel at the spatial pixel position in the second image set; and S8: dividing the effective monitoring number image from the drying-up number image to obtain a drying-up frequency image.

Further, the target region may be obtained as follows:

generating a buffering region with a specified width based on intra-regional watercourse vector data to serve as the target region.

Further, the preprocessing may include radiometric calibration, atmospheric correction, geometric correction, ortho-rectification and cloud removal.

Further, S5 may further include:

removing an influence of each of a bridge, a ship and a central bar in the river drying-up region.

According to a second aspect, the present disclosure provides an apparatus for extracting a river drying-up region and frequency, including:

a data acquisition module, configured to acquire an optical remote sensing image set of a target region within a specified time period;

a preprocessing module, configured to preprocess remote sensing images in the optical remote sensing image set to obtain multiple preprocessed images;

an iNDWI image acquisition module, configured to compute, for each of the preprocessed images, iNDWI values of pixels in the preprocessed image, and add the iNDWI values as new bands to a remote sensing image corresponding to the preprocessed image, to obtain multiple iNDWI images, $$iNDWI=(P_{NIR}-P_{Green})/(P_{NIR}+P_{Green})$$

where, $P_{NIR}$ and $P_{Green}$ are reflectivities of a near-infrared (NIR) band and a green band in the preprocessed image, respectively;

a largest composite iNDWI image acquisition module, configured to take, for a same spatial pixel position, pixels having maximum iNDWI values in all iNDWI images to obtain a maximum iNDWI pixel at the spatial pixel position, and mosaic maximum iNDWI pixels of all spatial pixel positions according to the spatial positions to obtain a largest composite iNDWI image;

a river drying-up region extraction module, configured to set an iNDWI threshold, and extract all pixels with values greater than the iNDWI threshold in the largest composite iNDWI image to obtain the river drying-up region;

an effective monitoring number image acquisition module, configured to crop the iNDWI images according to the river drying-up region to obtain a first image set, and composite the first image set into an effective monitoring number image having a single band, where, a band value at each spatial pixel position in the effective monitoring number image is a number of images each having an effective pixel at the spatial pixel position in the first image set;

a drying-up number image acquisition module, configured to remove all pixels with values not greater than the iNDWI threshold in the iNDWI images with a masking method to obtain a second image set, and composite the second image set into a drying-up number image having a single band, where, a band value at each spatial pixel position in the drying-up number image is a number of images each having an effective pixel at the spatial pixel position in the second image set; and a drying-up frequency image acquisition module, configured to divide the effective monitoring number image from the drying-up number image to obtain a drying-up frequency image.

Further, the target region may be obtained as follows:

generating a buffering region with a specified width based on intra-regional watercourse vector data to serve as the target region.

Further, the preprocessing may include radiometric calibration, atmospheric correction, geometric correction, ortho-rectification and cloud removal.

Further, the river drying-up region extraction module may further be configured to:

remove an influence of each of a bridge, a ship and a central bar in the river drying-up region.

According to a third aspect, the present disclosure provides a computer-readable storage medium for extracting a river drying-up region and frequency, including a memory for storing an instruction executable for a processor, where the instruction implements, when executed by the processor, the steps in the method for extracting a river drying-up region and frequency in the first aspect.

According to a fourth aspect, the present disclosure provides a device for extracting a river drying-up region and frequency, including at least one processor and a memory for storing an instruction executable for a computer, where the processor implements, when executing the instruction, the steps in the method for extracting a river drying-up region and frequency in the first aspect.

The present disclosure has the following beneficial effects:

The method for extracting a river drying-up region and frequency can be applied to efficiently acquiring river drying-up information for a long time within the large spatial region. With the iNDWI and the maximum value composite (MVC) method for the remote sensing images, the present disclosure omits the troublesome step of separately extracting a river range for each image in the conventional method. In addition, the present disclosure quickly obtains the drying-up frequency by counting the total number of available images and the number of non-water images at the same pixel position, and yields a greater efficiency for extracting the river drying-up region and frequency. The method for extracting a river drying-up region and frequency provided by the present disclosure is of great significance to reflect the reserves and periodical changes of regional river water resources and study the carrying capacity of the regional ecological environment.

DETAILED DESCRIPTION OF THE EMBODIMENTS

To make the to-be-solved technical problems, technical solutions, and advantages of the present disclosure clearer, the present disclosure will be described in detail below with reference to the accompanying drawings and specific embodiments.

Embodiment 1

Figure 1:
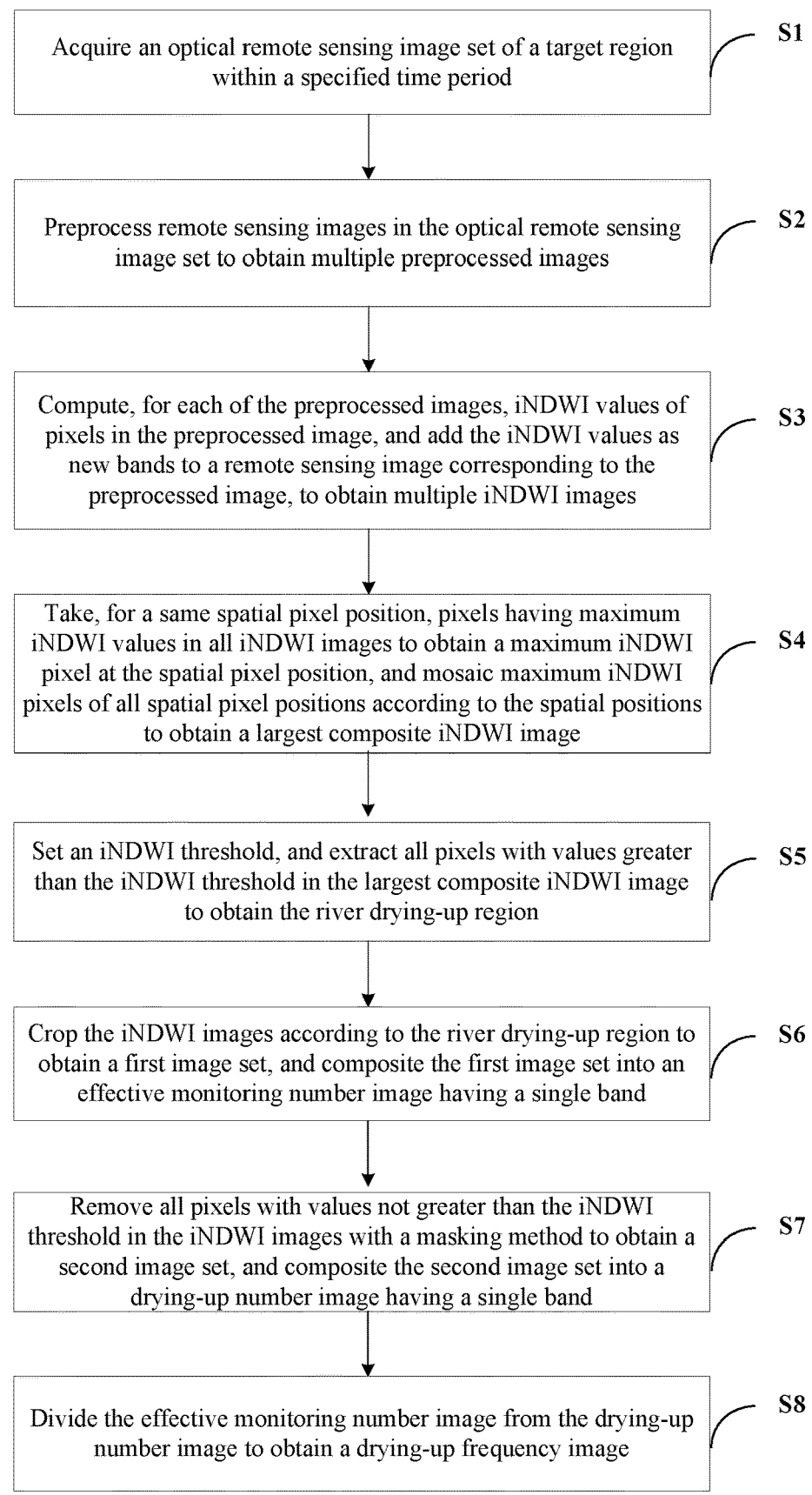
FIG. 1 illustrates a flow chart of a method for extracting a river drying-up region and frequency according to the present disclosure.

The embodiment of the present disclosure provides a method for extracting a river drying-up region and frequency. As shown in FIG. 1, the method includes the following steps:

S1: An optical remote sensing image set of a target region within a specified time period is acquired.

The step is intended to obtain an available remote sensing image set of the target region within the target time period. In actual implementations, it is proposed to acquire all available remote sensing images, or acquire multiple remote sensing images every few days or every day.

The target region may be determined as follows:

A buffering region (the radius of which should be equal to or greater than the width of the river) with a specified width is generated based on intra-regional watercourse vector data to serve as the target region for determining drying-up of rivers.

S2: Remote sensing images in the optical remote sensing image set are preprocessed to obtain multiple preprocessed images.

The step is intended to perform radiometric calibration, atmospheric correction, geometric correction, ortho-rectification, cloud removal and the like as required according to levels of the remote sensing images.

S3: For each of the preprocessed images, iNDWI values of pixels in the preprocessed image are computed, and the iNDWI values are added as new bands to a remote sensing image corresponding to the preprocessed image, to obtain multiple iNDWI images.

$$iNDWI=(P_{NIR}-P_{Green})/(P_{NIR}+P_{Green})$$

where, $P_{NIR}$ and $P_{Green}$ are reflectivities of an NIR band and a green band in the preprocessed image, respectively.

The step uses the iNDWI, which is an improvement to the mature NDWI for extracting the surface water. The iNDWI values of the pixels in each of the preprocessed images are computed, and the iNDWI values are added as the new bands to the original remote sensing image corresponding to the preprocessed image, to obtain the iNDWI images.

S4: For a same spatial pixel position, pixels having maximum iNDWI values in all iNDWI images are taken to obtain a maximum iNDWI pixel at the spatial pixel position, and maximum iNDWI pixels of all spatial pixel positions are mosaicked according to the spatial positions to obtain a largest composite iNDWI image.

The step uses an MVC method, and is intended to mosaic the iNDWI image set in S3 based on the iNDWI values. Specifically, for the same spatial pixel position, the pixels having the maximum iNDWI values in all iNDWI images are taken to obtain the single largest composite iNDWI image, namely the image including a largest river drying-up region.

S5: An iNDWI threshold is set, and all pixels with values greater than the iNDWI threshold in the largest composite iNDWI image are extracted to obtain the river drying-up region.

The iNDWI threshold may be determined with a threshold segmentation method such as an empirical method or an Otsu's method.

In the step, an influence of each of a bridge, a ship and a central bar in the river drying-up region can further be removed. The influences of the bridge, ship and central bar can be removed according to features such as the shape of the bridge and the rule that the ship and the central bar are surrounded by the water.

S6: The iNDWI images are cropped according to the river drying-up region to obtain a first image set, and the first image set is composited into an effective monitoring number image having a single band.

A band value at each spatial pixel position in the effective monitoring number image is a number of images each having an effective pixel at the spatial pixel position in the first image set, and represents a number of effective monitoring times at the spatial pixel position.

S7: All pixels with values not greater than the iNDWI threshold in the iNDWI images are removed with a masking method to obtain a second image set, namely, pixels determined as water are removed, and the second image set is composited into a drying-up number image having a single band.

A band value at each spatial pixel position in the drying-up number image is a number of images each having an effective pixel at the spatial pixel position in the second image set, and represents a number of drying-up times.

S8: The effective monitoring number image is divided from the drying-up number image to obtain a drying-up frequency image.

The step obtains the drying-up frequency image by dividing the effective monitoring number image from the drying-up number image, namely, the band value at each pixel as a result of "the number of drying-up times/the number of effective monitoring times at the position" represents the drying-up frequency at the pixel.

The method for extracting a river drying-up region and frequency can be applied to efficiently acquiring river drying-up information for a long time within the large spatial region. With the iNDWI and the MVC method for the remote sensing images, the present disclosure omits the troublesome step of separately extracting a river range for each image in the conventional method. In addition, the present disclosure quickly obtains the drying-up frequency by counting the total number of available images and the number of non-water images at the same pixel position, and yields a greater efficiency for extracting the river drying-up region and frequency. The method for extracting a river drying-up region and frequency provided by the present disclosure is of great significance to reflect the reserves and periodical changes of regional river water resources and study the carrying capacity of the regional ecological environment.

For ease of better understanding and implementation of the present disclosure to a person of ordinary skill in the art, the case in which Sentinel-2 MSI Level-1C remote sensing images are used on the Google Earth Engine platform to extract a river drying-up region and frequency in summer (June to September) of 2020 in Boding (China) is taken as an example to further describe the present disclosure in detail:

1. A buffering region with a buffering radius of 100 m is generated based on intra-regional watercourse vector data to serve as a target region for determining drying-up of rivers.
2. An optical image set of the target region within a specified time period is acquired.

In the step, all available Sentinel-2 MSI Level-1C image sets about Baoding in summer of 2020, including 395 remote sensing images, are obtained.

3. The remote sensing images are preprocessed.

The step is intended to perform radiometric calibration, atmospheric correction, geometric correction, ortho-rectification, cloud removal and the like as required according to levels of the remote sensing images.

With the CLOUD_COVERAGE_ASSESSMENT for the Sentinel-2 remote sensing images, the step sets the threshold as 10%, and filters images having cloud coverage properties greater than 10%. As a result, there are 26 preprocessed images remaining in the image set.

4. Improvements are made to the mature NDWI for extracting the surface water to form the iNDWI, iNDWI values of pixels in each of the preprocessed images are computed, and the iNDWI values are added as new bands to an original remote sensing image corresponding to the preprocessed image to obtain an iNDWI image set. The iNDVI value is calculated as follows:

$$iNDWI=(P_{NIR}-P_{Green})/(P_{NIR}+P_{Green})$$

In the foregoing formula, $P_{NIR}$ and $P_{Green}$ are reflectivities of an NIR band and a green band in the preprocessed image, respectively. In the Sentinel-2 MSI Level-1C images, $P_{Green}$ corresponds to the band B3, and $P_{NIR}$ corresponds to the band B8.

5. With the utilization of an MVC method, the iNDWI image set is mosaicked based on iNDWI values. Specifically, for a same spatial pixel position, pixels having maximum iNDWI values in all iNDWI images are taken to obtain a single largest composite iNDWI image, namely the image including the largest river drying-up region.

6. For the largest composite iNDWI image, an iNDWI threshold is set as 0.3008 with an Otsu's method, and all pixels with values greater than the iNDWI threshold are extracted to form the river drying-up region.

7. An influence of each of a bridge, a ship and a central bar in the river drying-up region is removed.

8. The iNDWI images are cropped according to the river drying-up region to obtain a first image set, and the first image set is composited into an effective monitoring number image having a single band. A band value at each pixel in the image is a number of images each having an effective pixel at the position in the first image set, and represents a number of effective monitoring times at the position.

9. All pixels with values less than the iNDWI threshold in the iNDWI image set are removed with a masking method to obtain a second image set, namely, all pixels determined as water are removed, and the second image set is composted into a drying-up number image having a single band. A band value at each pixel in the image is a number of images each having an effective pixel at the position in the second image set, and represents a number of drying-up times.

10. The effective monitoring number image is divided from the drying-up number image to obtain a drying-up frequency image, namely, the band value at each pixel as a result of "the number of drying-up times/the number of effective monitoring times at the position" represents the drying-up frequency at the pixel.

Embodiment 2

Figure 2:
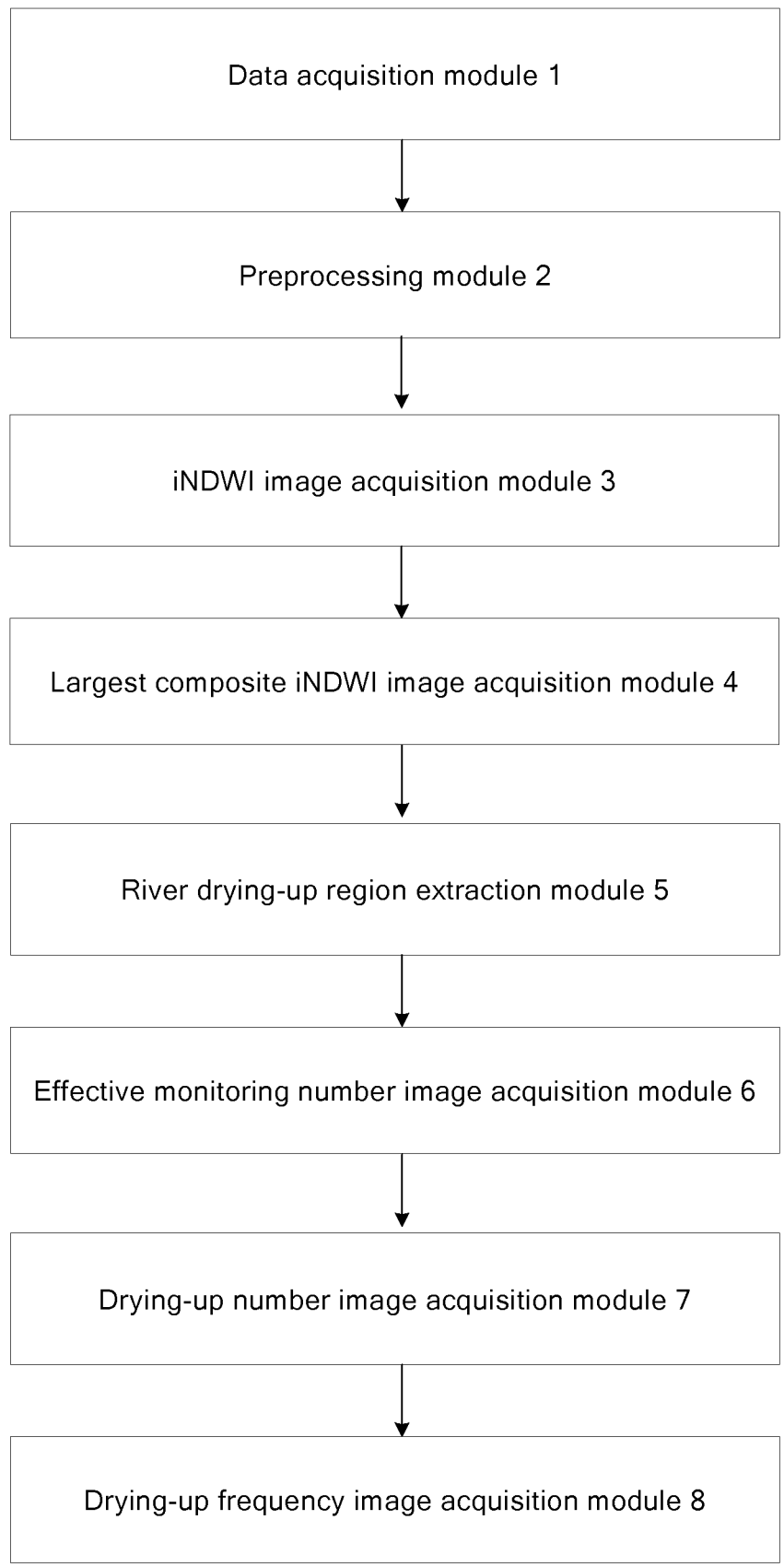
FIG. 2 illustrates a schematic view of an apparatus for extracting a river drying-up region and frequency according to the present disclosure.

The embodiment of the present disclosure provides an apparatus for extracting a river drying-up region and frequency. As shown in FIG. 2, the apparatus includes:

- a data acquisition module 1, configured to acquire an optical remote sensing image set of a target region within a specified time period;
- a preprocessing module 2, configured to preprocess remote sensing images in the optical remote sensing image set to obtain multiple preprocessed images;
- an iNDWI image acquisition module 3, configured to compute, for each of the preprocessed images, iNDWI values of pixels in the preprocessed image, and add the iNDWI values as new bands to a remote sensing image corresponding to the preprocessed image, to obtain multiple iNDWI images, $$iNDWI=(P_{NIR}-P_{Green})/(P_{NIR}+P_{Green})$$

where, $P_{NIR}$ and $P_{Green}$ are reflectivities of an NIR band and a green band in the preprocessed image, respectively;
- a largest composite iNDWI image acquisition module 4, configured to take, for a same spatial pixel position, pixels having maximum iNDWI values in all iNDWI images to obtain a maximum iNDWI pixel at the spatial pixel position, and mosaic maximum iNDWI pixels of all spatial pixel positions according to the spatial positions to obtain a largest composite iNDWI image;
- a river drying-up region extraction module 5, configured to set an iNDWI threshold, and extract all pixels with values greater than the iNDWI threshold in the largest composite iNDWI image to obtain the river drying-up region;
- an effective monitoring number image acquisition module 6, configured to crop the iNDWI images according to the river drying-up region to obtain a first image set, and composite the first image set into an effective monitoring number image having a single band, where, a band value at each spatial pixel position in the effective monitoring number image is a number of images each having an effective pixel at the spatial pixel position in the first image set;
- a drying-up number image acquisition module 7, configured to remove all pixels with values not greater than the iNDWI threshold in the iNDWI images with a masking method to obtain a second image set, and composite the second image set into a drying-up number image having a single band, where, a band value at each spatial pixel position in the drying-up number image is a number of images each having an effective pixel at the spatial pixel position in the second image set; and
- a drying-up frequency image acquisition module 8, configured to divide the effective monitoring number image from the drying-up number image to obtain a drying-up frequency image.

The target region may be obtained as follows:

A buffering region with a specified width is generated based on intra-regional watercourse vector data to serve as the target region.

The preprocessing includes radiometric calibration, atmospheric correction, geometric correction, ortho-rectification and cloud removal.

In an improvement to the present disclosure, the river drying-up region extraction module is further configured to: remove an influence of each of a bridge, a ship and a central bar in the river drying-up region.

The apparatus provided by the embodiment of the present disclosure has the same implementation principles and technical effects as the foregoing method embodiment. For the simplicity of description, contents not mentioned in the apparatus embodiment may refer to those in Method Embodiment 1. The person skilled in the art can clearly understand that, for convenience and brevity of description, reference may be made to corresponding processes in the foregoing method embodiment for specific working processes of the foregoing apparatus and units. Details are not described herein again.

Embodiment 3

The method provided in Embodiment 1 of the present disclosure can implement a service logic through a computer program and record the service logic on a storage medium. The storage medium may be read and executed by a computer to achieve the effects of the solutions in Embodiment 1 of the present disclosure. Therefore, the present disclosure further provides a computer-readable storage medium for extracting a river drying-up region and frequency, including a memory for storing an instruction executable for a processor, where the instruction implements, when executed by the processor, the steps in the method for extracting a river drying-up region and frequency in Embodiment 1.

The storage medium may include a physical apparatus for storing information. Generally, the information is digitalized and stored with media electrically, magnetically or optically. The storage medium may include: an apparatus for storing the information electrically, for example, various memories such as a random access memory (RAM) and a read only memory (ROM); an apparatus for storing the information magnetically, such as a hard disk, a floppy, a magnetic taper, a magnetic core memory, a magnetic bubble memory and a U disk; and an apparatus for storing the information optically, such as a compact disc (CD) or a digital video disk (DVD). Certainly, there are further other readable storage media, such as a quantum memory and a graphene memory.

The storage medium may further include other implementations according to descriptions in Method Embodiment 1. The implementation principles and technical effects in the embodiment are the same as those of Method Embodiment 1 and may specifically refer to relevant descriptions in Method Embodiment 1. Details are not described herein again.

Embodiment 4

The present disclosure further provides a device for extracting a river drying-up region and frequency. The device may be a standalone computer, and may also include an actual operating device and the like using one or more methods or one or more apparatuses in the specification. The device for extracting a river drying-up region and frequency may include at least one processor and a memory for storing an instruction executable for a computer, where the processor implements, when executing the instruction, any one or more steps in the method for extracting a river drying-up region and frequency in Embodiment 1.

The device may further include other implementations according to descriptions in Method Embodiment 1. The implementation principles and technical effects in the embodiment are the same as those of Method Embodiment 1 and may specifically refer to relevant descriptions in Method Embodiment 1. Details are not described herein again.

It is to be noted that the apparatus or system may further include other implementations according to relevant descriptions in the method embodiment. For specific implementations, refer to the descriptions in the method embodiment. Details are not described herein again. The embodiments in the specification are described in a progressive manner. For same or similar parts between embodiments, reference may be made to each other. Each embodiment focuses on a difference from other embodiments. Particularly for embodiments such as hardware+program, and storage medium+program, since they are basically similar to the method embodiment, the description is relatively simple, and reference can be made to the descriptions of the method embodiment.

The foregoing describes the specific embodiments of the present disclosure. Other embodiments fall within the scope of the appended claims. In some cases, the actions or steps described in the claims may be performed in sequences different from those in the embodiments and still achieve expected results. In addition, the processes depicted in the accompanying drawings unnecessarily require the specific orders or sequential orders shown for achieving the expected results. In some implementations, multitasking and parallel processing are also possible or may be advantageous.

The system, apparatus, modules and units described in the foregoing embodiments may be specifically implemented by a computer chip or entity, or implemented by a product with a specific function. One typical implementation device is the computer. Specifically, the computer may be, for example, a personal computer, a laptop computer, a vehicle-mounted man-machine interactive device, a cellular phone, a camera phone, a smartphone, a personal digital assistant (PDA), a media player, a navigation device, an E-mail device, a game console, a tablet computer, a wearable device or a combination thereof.

For ease of description, the foregoing apparatus is divided into various modules based on functions for separate description. Certainly, functions of one or more modules may be implemented in one or more pieces of software and/or hardware, or modules having the same functions are implemented by a combination of multiple submodules or subunits. The described apparatus embodiment is merely schematic. For example, the unit division is merely logical function division and may be another division in actual implementation. For example, a plurality of units or components may be combined or integrated into another system, or some features may be ignored or not performed. In addition, the displayed or discussed mutual couplings or direct couplings or communicative connections may be implemented through some interfaces. The indirect couplings or communicative connections between the apparatuses or units may be implemented in electrical, mechanical, or other forms.

The person skilled in the art are aware that in addition to being realized by using pure computer-readable program code, a controller can realize the same functions in a form of a logic gate, a switch, an application-specific integrated circuit, a programmable logic controller, or an embedded microcontroller by performing logic programming on the method steps. Therefore, the controller may be considered as a hardware component, and apparatuses for implementing various functions in the controller may also be considered as structures in the hardware component; or even the apparatuses for implementing various functions may be considered as software modules for implementing the method as well as the structures in the hardware component.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, the computing device includes one or more central processing units (CPUs), an input/output (I/O) interface, a network interface and a memory.

It should also be noted that the term "comprise", "include", or any other variant thereof is intended to encompass a non-exclusive inclusion, such that a process, method, product, or device that includes a series of elements includes not only those elements, but also other elements not explicitly listed, or elements that are inherent to such a process, method, product, or device. In case there are no more restrictions, an element limited by the statement "including a . . . " does not exclude the presence of additional identical elements in the process, the method, the article, or the device that includes the element.

The person skilled in the art should understand that one or more embodiments of the present disclosure may be provided as a method, a system, or a computer program product. Therefore, the one or more embodiments of the present disclosure may be in a form of hardware only embodiments, software only embodiments, or embodiments with a combination of software and hardware. Moreover, the one or more embodiments of the present disclosure may use a form of a computer program product that is implemented on one or more computer-usable storage media (including but not limited to a disk memory, a CD-ROM, an optical memory, and the like) that include computer-usable program codes.

The one or more embodiments of the present disclosure may be described in general contexts of computer executable instructions executed by a computer, such as a program module. Generally, the program module includes a routine, a program, an object, a component, a data structure, and the like that perform specific tasks or implement specific abstract data types. The one or more embodiments of the present disclosure may alternatively be practiced in a distributed computing environment in which a task is performed by a remote processing device connected through a communication network. In the distributed computing environment, the program module may be located in local and remote computer storage media including a storage device.

The embodiments in the specification are described in a progressive manner. For same or similar parts between embodiments, reference may be made to each other. Each embodiment focuses on a difference from other embodiments. For a system embodiment, since it corresponds to the method embodiment, the description is relatively simple, and reference can be made to the description of the method embodiment. In this specification, descriptions of reference terms such as "one embodiment", "some embodiments", "an example", "a specific example" and "some examples" indicate that specific features, structures, materials or characteristics described in combination with the embodiment(s) or example(s) are included in at least one embodiment or example of the present disclosure. In this specification, schematic representation of the above terms is unnecessarily directed to the same embodiment or example. Moreover, the specific features, structures, materials or characteristics described may be combined in a suitable manner in any one or more embodiments or examples. In addition, a person skilled in the art may combine different embodiments or examples described in this specification and characteristics of the different embodiments or examples without mutual contradiction.

Finally, it should be noted that the foregoing examples are merely specific implementations of the present disclosure, and are used to describe rather than limiting the technical solutions of the present disclosure. The protection scope of the present disclosure is not limited thereto. Although the present disclosure is described in detail with reference to the foregoing examples, it should be understood that a person of ordinary skill in the art can still make modifications to or readily figure out changes in the technical solutions described in the foregoing examples, or make equivalent substitutions on some technical features therein. These modifications, changes, or substitutions do not make the essence of the corresponding technical solutions depart from the spirit and scope of the technical solutions of the examples of the present disclosure, and shall all fall within the protection scope of the present disclosure. Therefore, the protection scope of the present disclosure shall be subject to the protection scope of the claims.

What is claimed is:

1. A method for extracting a river drying-up region and frequency, comprising:
    S1: acquiring an optical remote sensing image set of a target region within a specified time period;
    S2: preprocessing remote sensing images in the optical remote sensing image set to obtain multiple preprocessed images;
    S3: computing, for each of the preprocessed images, inverse normalized difference water index (iNDWI) values of pixels in the preprocessed image, and adding the iNDWI values as new bands to a remote sensing image corresponding to the preprocessed image, to obtain multiple iNDWI images, $$iNDWI=(P_{NIR}-P_{Green})/(P_{NIR}+P_{Green})$$

wherein, $P_{NIR}$ and $P_{Green}$ are reflectivities of a near-infrared (NIR) band and a green band in the preprocessed image, respectively;
    S4: taking, for a same spatial pixel position, pixels having maximum iNDWI values in all iNDWI images to obtain a maximum iNDWI pixel at the spatial pixel position, and mosaicking maximum iNDWI pixels of all spatial pixel positions according to the spatial positions to obtain a largest composite iNDWI image;
    S5: setting an iNDWI threshold, and extracting all pixels with values greater than the iNDWI threshold in the largest composite iNDWI image to obtain the river drying-up region;
    S6: cropping the iNDWI images according to the river drying-up region to obtain a first image set, and compositing the first image set into an effective monitoring number image having a single band,
    wherein, a band value at each spatial pixel position in the effective monitoring number image is a number of images each having an effective pixel at the spatial pixel position in the first image set;
    S7: removing all pixels with values not greater than the iNDWI threshold in the iNDWI images with a masking method to obtain a second image set, and compositing the second image set into a drying-up number image having a single band, wherein, a band value at each spatial pixel position in the drying-up number image is a number of images each having an effective pixel at the spatial pixel position in the second image set; and S8: dividing the effective monitoring number image from the drying-up number image to obtain a drying-up frequency image.

2. The method for extracting a river drying-up region and frequency according to claim 1, wherein the target region is obtained as follows:

generating a buffering region with a specified width based on intra-regional watercourse vector data to serve as the target region.

3. The method for extracting a river drying-up region and frequency according to claim 2, wherein the preprocessing comprises radiometric calibration, atmospheric correction, geometric correction, ortho-rectification and cloud removal.

4. The method for extracting a river drying-up region and frequency according to claim 3, wherein S5 further comprises:

removing an influence of each of a bridge, a ship and a central bar in the river drying-up region.

5. A device for extracting a river drying-up region and frequency, comprising at least one processor and a memory for storing an instruction executable for a computer, wherein the processor implements, when executing the instruction, the steps in the method for extracting a river drying-up region and frequency according to claim 1.

6. The device according to claim 5, wherein the target region is obtained as follows: generating a buffering region with a specified width based on intra-regional watercourse vector data to serve as the target region.

7. The device according to claim 6, wherein the preprocessing comprises radiometric calibration, atmospheric correction, geometric correction, ortho-rectification and cloud removal.

8. The device according to claim 7, wherein S5 further comprises:

removing an influence of each of a bridge, a ship and a central bar in the river drying-up region.

* * * * *